(12) United States Patent
Yoo et al.

(10) Patent No.: US 8,629,602 B2
(45) Date of Patent: Jan. 14, 2014

(54) MOTOR

(75) Inventors: Young Sun Yoo, Gyunggi-do (KR); Pyo Kim, Gyunggi-do (KR); Ho Jun Yoo, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 72 days.

(21) Appl. No.: 13/328,957

(22) Filed: Dec. 16, 2011

(65) Prior Publication Data

US 2012/0153781 A1    Jun. 21, 2012

(30) Foreign Application Priority Data

Dec. 20, 2010   (KR) .................... 10-2010-0130717

(51) Int. Cl.
    *H02K 7/00*    (2006.01)
(52) U.S. Cl.
    USPC .................................. 310/425; 310/67 R
(58) Field of Classification Search
    USPC ................... 310/67 R, 405, 422, 425
    See application file for complete search history.

(56) References Cited

U.S. PATENT DOCUMENTS

| | | | | |
|---|---|---|---|---|
| 3,772,544 | A * | 11/1973 | Wrobel ........................... | 310/71 |
| 5,578,883 | A * | 11/1996 | Sakashita et al. ............... | 310/91 |
| 5,910,693 | A * | 6/1999 | Park ............................ | 310/67 R |
| 7,521,831 | B2 * | 4/2009 | Smirnov et al. ................. | 310/90 |
| 7,830,054 | B2 * | 11/2010 | Lee ................................ | 310/90 |
| 2008/0169709 | A1* | 7/2008 | Lee ................................ | 310/42 |
| 2012/0017225 | A1* | 1/2012 | Smirnov et al. ............... | 720/695 |

FOREIGN PATENT DOCUMENTS

| | | |
|---|---|---|
| JP | 2007-185039 A | 7/2007 |
| JP | 2007-236118 A | 9/2007 |
| KR | 10-2006-0111816 A | 10/2006 |

* cited by examiner

*Primary Examiner* — Dang Le
(74) *Attorney, Agent, or Firm* — McDermott Will & Emery LLP (57) ABSTRACT

There is provided a motor including a sleeve rotatably supporting a shaft; a sleeve holder having the sleeve inserted thereinto and including fixing parts; and a base member including fixing counterparts corresponding to the fixing parts of the sleeve holder and fixedly coupled to the sleeve holder, wherein the sleeve holder and the base member have guide parts and guide counterparts respectively provided therein, the guide parts and guide counterparts having corresponding shapes and guiding the sleeve holder to a mounting position thereof.

12 Claims, 7 Drawing Sheets

MOTOR

CROSS-REFERENCE TO RELATED APPLICATIONS

This application claims the priority of Korean Patent Application No. 10-2010-0130717 filed on Dec. 20, 2010, in the Korean Intellectual Property Office, the disclosure of which is incorporated herein by reference.

BACKGROUND OF THE INVENTION

1. Field of the Invention

The present invention relates to a motor, and more particularly, to a high speed rotating motor on which a disc is seated.

2. Description of the Related Art

Generally, a spindle motor provided in an optical disc drive serves to rotate a disc so that an optical pickup mechanism can read data recorded on the disk.

Meanwhile, a spindle motor according to the related art has a coupling structure that fixes a circuit board mounted on a base plate included in the spindle motor to the base plate by a sleeve holder inserted into a hole formed at the central portion of the base plate. In addition, a separate support plate is fastened to the bottom surface of the sleeve holder so that it fixedly mounts the sleeve holder.

As described above, when the sleeve holder is fixedly mounted on the base plate, a manufacturing process is complicated and separate members must be individually manufactured, thereby increasing the number of manufacturing processes and costs associated therewith.

SUMMARY OF THE INVENTION

An aspect of the present invention provides a motor achieving a reduction in the number of manufacturing processes and costs associated therewith.

According to an aspect of the present invention, there is provided a motor including: a sleeve rotatably supporting a shaft; a sleeve holder having the sleeve inserted thereinto and including fixing parts; and a base member including fixing counterparts corresponding to the fixing parts of the sleeve holder and fixedly coupled to the sleeve holder, wherein the sleeve holder and the base member have guide parts and guide counterparts respectively provided therein, the guide parts and guide counterparts having corresponding shapes and guiding the sleeve holder to a mounting position thereof.

The fixing counterparts may be configured as through holes disposed in the base member to be spaced apart from each other in a circumferential direction, the fixing parts may be configured as insertion holes interlocking with the fixing counterparts, and the fixing parts and the fixing counterparts may be coupled with the fixing supporters to thereby fix the sleeve holder to the base member.

The fixing counterparts may be configured as through holes disposed in the base member to be spaced apart from each other in a circumferential direction, and the fixing parts may be configured as insertion protrusions inserted into the fixing counterparts.

The fixing parts may have burning parts for being fixedly coupled with the base member.

The sleeve holder may include: a body part in which the sleeve is fixedly mounted; an extension part stepped from the body part in order to have a larger outer diameter than that of the body part; and a flange part extended outwardly from the extension part in a radial direction.

The body part may be connected with the extension part stepped from the body part to thereby form a stator seating surface on which a stator is horizontally mounted.

The base member may include: a shaft groove having the shaft disposed on an upper portion thereof; a stopper ring support part having a step from the shaft groove; and a protruding part extended upwardly from the stopper ring support part.

The protruding part may be disposed in an extended hole extended from a mounting hole provided in the body part to fix the sleeve when the sleeve holder is mounted on the base member.

The guide parts and the guide counterparts may cooperate with each other and be configured as grooves and protrusions for guiding the mounting position in which the sleeve holder is mounted on the base member.

The guiding parts may be mounted on the base member to be disposed between the plurality of fixing counterparts formed on the base member, and the guide counterparts may be formed on a flange part provided in the sleeve holder to be disposed to correspond to the guide parts.

The motor may further include a rotor case coupled to an upper portion of the shaft and including a magnet disposed to be opposite to a stator seated on the sleeve holder.

The motor may further include a chucking unit mounted on an outer circumferential surface of a hub extended upwardly from the rotor case and allowing a disc to be mounted thereon.

The sleeve holder may be molded by a press process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like elements.

Figure 1:
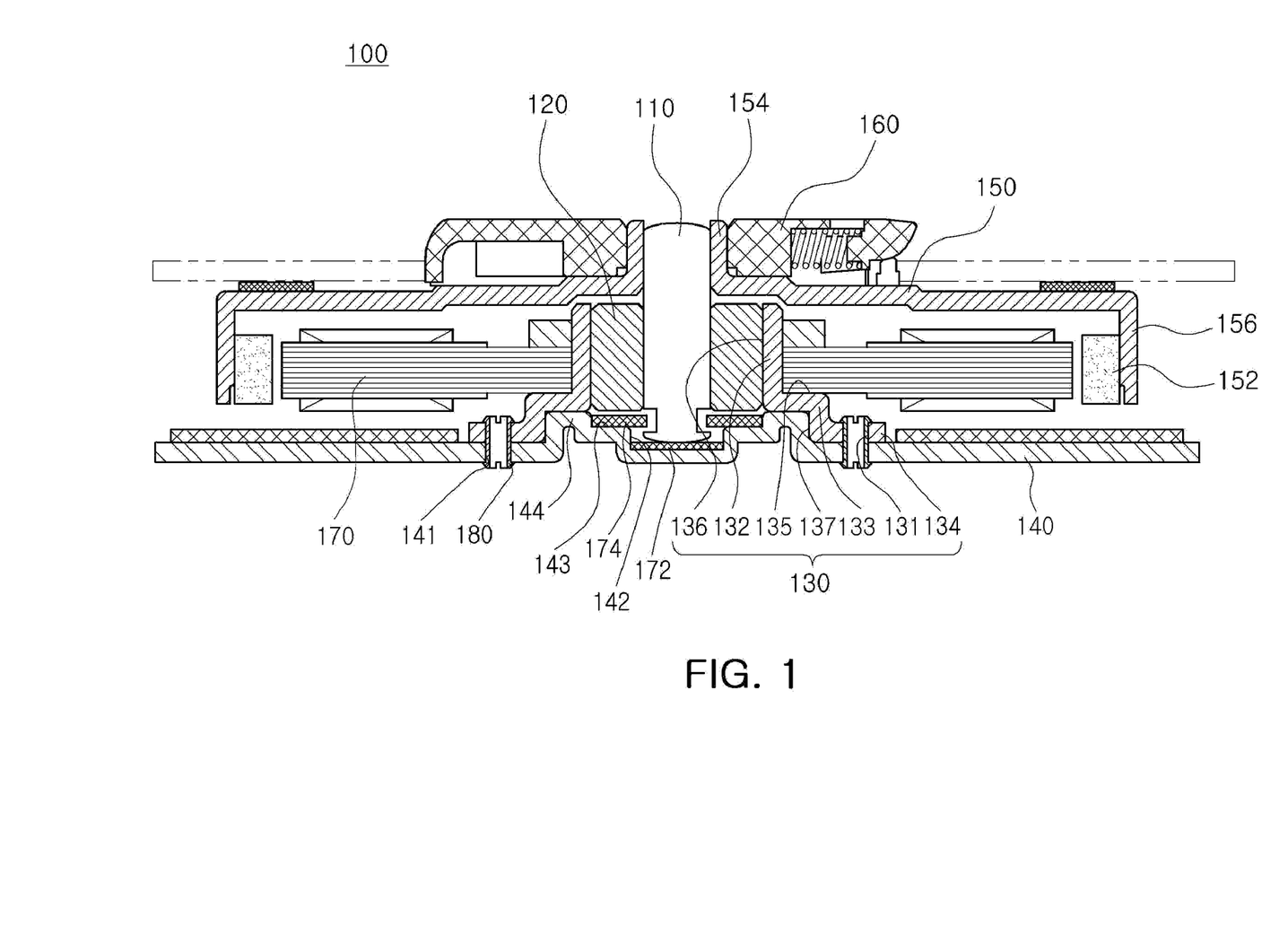
FIG. 1 is a cross-sectional view schematically showing a motor according to an exemplary embodiment of the present invention.
Figure 2:
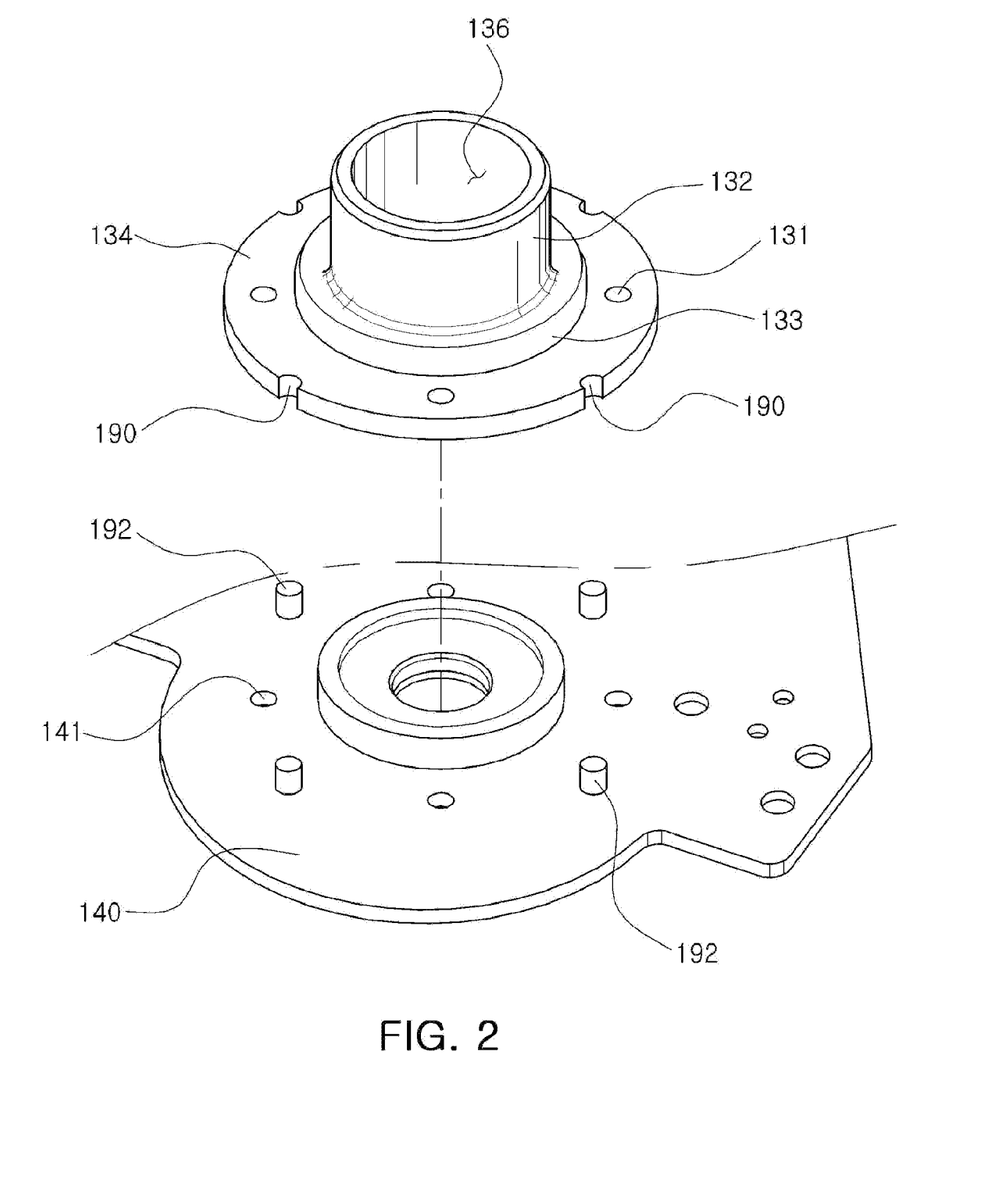
FIG. 2 is an exploded perspective view showing a base member and a sleeve holder according to the exemplary embodiment of the present invention.
Figure 3:
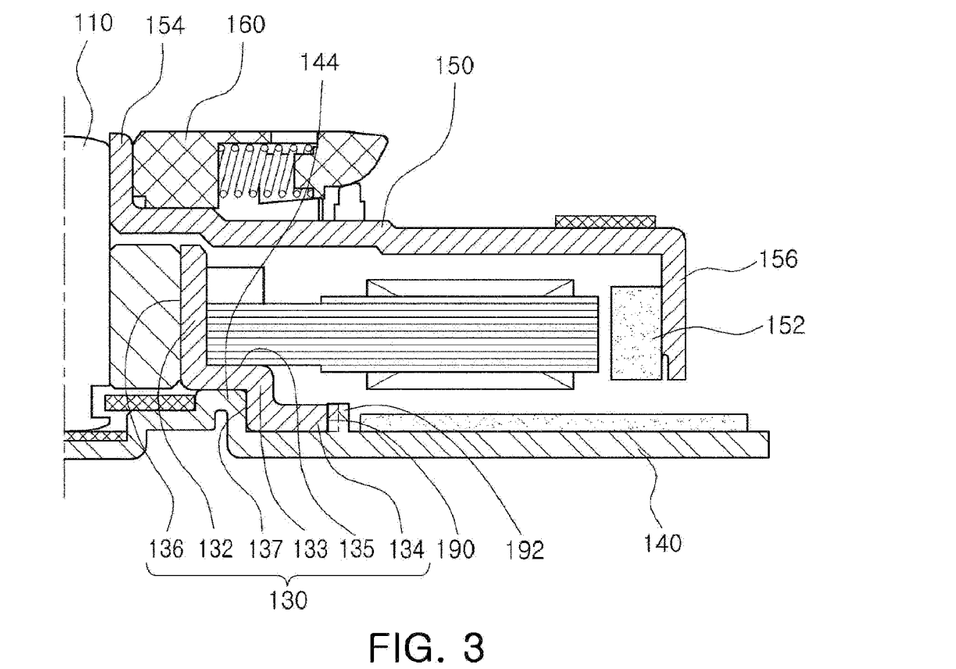
FIG. 3 is a cross-sectional view schematically showing a guide part and a guide counterpart of a motor according to an exemplary embodiment of the present invention.

FIG. 1 is a cross-sectional view schematically showing a motor according to an exemplary embodiment of the present invention, FIG. 2 is an exploded perspective view showing a base member and a sleeve holder according to an exemplary embodiment of the present invention, and FIG. 3 is a cross-sectional view schematically showing a guide part and a guide counterpart of a motor according to an exemplary embodiment of the present invention.

Referring to FIGS. 1 and 3, a motor 100 according to an exemplary embodiment of the present invention may be configured to include a sleeve 120, a sleeve holder 130, a base member 140, a rotor case 150, and a chucking unit 160.

The sleeve 120 rotatably supports a shaft 110. To this end, the sleeve 120 may have a hollow cylindrical shape. That is, the shaft 110 may be rotatably mounted on the sleeve 120 having a hollow cylindrical shape.

Meanwhile, the sleeve 120 is fixedly mounted on the sleeve holder 130, thereby supporting the shaft 110 when the shaft 110 rotates. In addition, the sleeve 120 may be formed by forging Cu or Al or sintering Cu—Fe-based alloy powders or SUS-based powders.

Meanwhile, terms used herein associated with directions will now be defined. As viewed in FIG. 1, an axial direction refers to a vertical direction on the basis of the shaft 110; a radial direction refers to a direction from the shaft 110 towards an outer surface of the rotor case 150 or a direction from the outer surface of the rotor case 150 towards the shaft 110; and a circumferential direction refers to a direction rotation along an outer circumferential surface of the shaft 110.

The sleeve 120 is inserted into the sleeve holder 130 and the sleeve holder 130 includes fixing parts 131. In more detail, the sleeve holder 130 may include a body part 132 in which the sleeve 120 is fixedly mounted, an extension part 133 stepped from the body part 132 in order to have a larger outer diameter than that of the body part 132, and a flange part 134 extended outwardly from the extension part 133 in the radial direction.

Meanwhile, the outer circumferential surface of the sleeve holder 130 may be provided with a stator seating surface 135. That is, the body part 132 may be connected to the extension part 133 stepped from the body part 132 in order to form the stator seating surface 135 on which the stator 170 is horizontally mounted.

In addition, the sleeve holder 130 includes a mounting hole 136 provided in the body part 132 to fix the sleeve 120, an extended hole 137 extended from the mounting hole 136 on bottom of the mounting hole 136.

That is, the body part 132 is provided with the mounting hole 136, in which the sleeve 120 is fixedly mounted, and the extended hole 137 provided on the bottom of the mounting hole 136 and having a larger diameter than that of the mounting hole 136.

The fixing parts 131 may be configured as insertion holes disposed to be spaced apart from each other in the flange part 134 in the circumferential direction.

In addition, the sleeve holder 130 may be molded by a press process. That is, the sleeve holder 130 is molded by the press process, such that the sleeve holder 130 may be easily manufactured. In other words, since the sleeve holder 130 is manufactured by the press process as compared with a sleeve holder formed by a cutting process according to the related art, the manufacturing process thereof may be simplified and the manufacturing costs thereof may be reduced.

Meanwhile, a detailed description of the sleeve holder 130 will be described below.

The base member 140 includes fixing counterparts 141 corresponding to the fixing parts 131 of the sleeve holder 130 and the sleeve holder 130 is fixedly mounted on the base member 140.

Meanwhile, the base member 140 may include a shaft groove 142 having the shaft 110 disposed on the upper portion thereof, a stopper ring support part 143 having a step from the shaft groove 142, and a protruding part 144 extended upwardly from the stopper ring support part 143.

The shaft groove 142 is provided with a thrust washer 172 for supporting the shaft 110 and the bottom surface of the shaft 110 is supported by the thrust washer 172.

Meanwhile, the stopper ring support part 143 is provided upwardly of the shaft groove 142 and has the stopper ring 174 seated thereon. In other words, the stopper ring support part 143 may be stepped from the shaft groove 142 and the shaft 110 may be mounted by passing through the stopper ring 174 seated on the stopper ring support part 143.

The protruding part 144 is extended upwardly from the edge of the stopper ring support part 143. In addition, when the sleeve holder 130 is mounted on the base member 140, the outer surface of the protruding part 144 may be disposed to contact the extended hole 137.

That is, the protruding part 144 may be inserted into a space formed by the sleeve 120 and the extended hole 137, thereby improving the verticality of the sleeve holder 130 when the sleeve holder 130 is mounted on the base member 140.

Meanwhile, the fixing counterparts 141 may be configured as through holes, corresponding to the fixing parts 131 disposed to be spaced apart from each other in the flange part 134, to be in connection therewith. That is, when the sleeve holder 130 is mounted on the base member 140, the fixing parts 131 and the fixing counterparts 141 may be disposed to interlock with one another.

The fixing counterparts 141 configured as the through holes and the fixing parts 131 configured as the insertion holes are coupled with fixing supporters 180, such that the sleeve holder 130 may be fixedly mounted on the base member 140.

Meanwhile, the fixing supporters 180 may be configured as eyelets. That is, the fixing supporters 180 configured as the eyelets are insertedly coupled to the fixing parts 131 and the fixing counterparts 141, such that the sleeve holder 130 may be fixedly mounted on the base member 140.

As described above, the sleeve holder 130 may be more easily mounted on the base member 140 by the fixing supporters 180 coupled to the fixing parts 131 and the fixing counterparts 141.

Meanwhile, the motor 100 according to the exemplary embodiment of the present invention may further include guide parts 190 and guide counterparts 192 respectively disposed on the sleeve holder 130 and the base member 140, having corresponding shapes and guiding a mounting position of the sleeve holder 130.

In addition, the guide parts 190 and the guide counterparts 192 may cooperate with each other and be configured as grooves and protrusions guiding the mounting position in which the sleeve holder 130 is mounted on the base member 140.

The guide parts 190 may be provided in the flange part 134 of the sleeve holder 130 and the guide counterparts 192 may be provided on the base member 140 to be disposed between the plurality of fixing counterparts 141 provided in the base member 140 such that the guide counterparts 192 may be disposed to correspond to the guide parts 190.

In more detail, the guide counterparts 192 may be configured as protrusions protruding from the top surface of the base member 140 to be disposed between the fixing counterparts 141 while being disposed outwardly of the protruding part 144 in the radial direction.

The guide parts 190 may be configured as grooves formed to be indented from the outer circumferential surface of the flange part 134 of the sleeve holder 130.

Therefore, when the sleeve holder 130 is mounted on the base member 140, the guide counterparts 192 may be inserted into the guide part 190 of the flange part 134, thereby guiding the mounting position of the sleeve holder 130.

Meanwhile, the guide parts 190 and the guide counterparts 192 may be provided in plural in order to temporarily fix the sleeve holder 130 to the base member 140. Without being limited thereto, only a pair of guide part and guide counterpart may be provided in order to merely guide the mounting position.

As described above, when the sleeve holder 130 is mounted on the base member 140, the guide part 190 and the guide counterpart 192 may allow the sleeve holder 130 to be mounted at a more accurate position.

In addition, since the sleeve holder 130 may be temporarily fixed to the base member 140 by the guide parts 190 and the guide counterparts 192, even when the sleeve holder 130 is fixed to the base member 140 by the fixing supporter 180 configured as the eyelet, the distortion and inclination of the sleeve holder 130 can be reduced.

Meanwhile, the motor 100 according to the exemplary embodiment of the present invention may further include the rotor case 150 coupled to the upper portion of the shaft 110 and including a magnet 152 disposed to be opposite to the stator 170 seated on the sleeve holder 130.

The rotor case 150 includes a hub 154 extended upwardly to be mounted on the shaft 110 while press-fitting the shaft 110. The hub 154 may have a cylindrical shape to correspond to the shape of the shaft 110.

That is, the hub 154 is mounted on the shaft 110 while press-fitting the shaft 110, such that the rotor case 150 may rotate in connection with the shaft 110 when the shaft 110 rotates.

Further, a magnet mounting part 156 may be provided at the edge of the rotor case 150 to be bent downwardly of the rotor case 150 and the magnet 152 is mounted thereon. That is, the magnet 152 having an annular shape is mounted on the inner circumferential surface of the magnet mounting part 156 and is disposed to be opposite to the stator 170 mounted on the sleeve holder 130.

As described above, the sleeve holder 130 is mounted on the base member 140 by improving the verticality of the sleeve holder 130, such that the rotor case 150 may be mounted on the shaft 110 while maintaining a regular interval between the stator 170 and the magnet 152 of the rotor case 150.

That is, the sleeve 120 mounted with the shaft 110 is fixedly mounted on the sleeve holder 130 by improving the verticality thereof, such that the rotor case 150 mounted on the shaft 110 may be more accurately positioned. Therefore, the regular interval between the stator 170 and the magnet 152 of the rotor case 150 may be maintained.

In addition, the motor 100 according to the exemplary embodiment of the present invention may further include the chucking unit 160 mounted on the outer circumferential surface of the hub extended upwardly from the rotor case 150 and allowing for the mounting of a disc thereon.

Meanwhile, the chucking unit 160 is fixedly mounted on the rotor case 150, such that the horizontality of the disc secured by the chucking unit 160 can be improved.

As described above, the sleeve holder 130 and the base member 140 may be accurately positioned by the guide parts 190 and the guide counterparts 192, thereby reducing the number of manufacturing processes.

In addition, the sleeve holder 130 may be fixed to the base member 140 in the state in which the sleeve holder 130 is temporarily fixed to the base member 140 by the guide parts 190 and the guide counterparts 192, such that the verticality of the sleeve holder 130 can be improved.

In addition, the sleeve holder 130 is mounted on the base member 140 such that the protruding part 144 provided on the base member 140 contacts the extended hole 137 of the sleeve holder 130, thereby further improving the verticality of the sleeve holder 130.

Further, the sleeve holder 130 may be fixedly coupled to the base member 140 by coupling the fixing supporters 180 with the fixing parts 131 and the fixing counterparts 141, so that the assembly process of the sleeve holder 130 and the base member 140 can be more easily performed.

In addition, the sleeve holder 130 may be fixedly coupled to the base member 140 by the fixing parts 131 and the fixing counterparts 141 to thereby improve the coupling force between the sleeve holder 130 and the base member 140, whereby the incidence of separation of the sleeve holder 130 from the base member 140 can be reduced.

Further, since the sleeve holder 130 is coupled to the base member 140 by the fixing parts 131 and the fixing counterparts 141, in the case in which defects occur therein, the sleeve holder 130 may be easily separated from the base member 140.

Hereinafter, a motor according to another exemplary embodiment of the present invention will be described with reference to the drawings. However, a detailed description of the same components as those mentioned above will be omitted.

Figure 4:
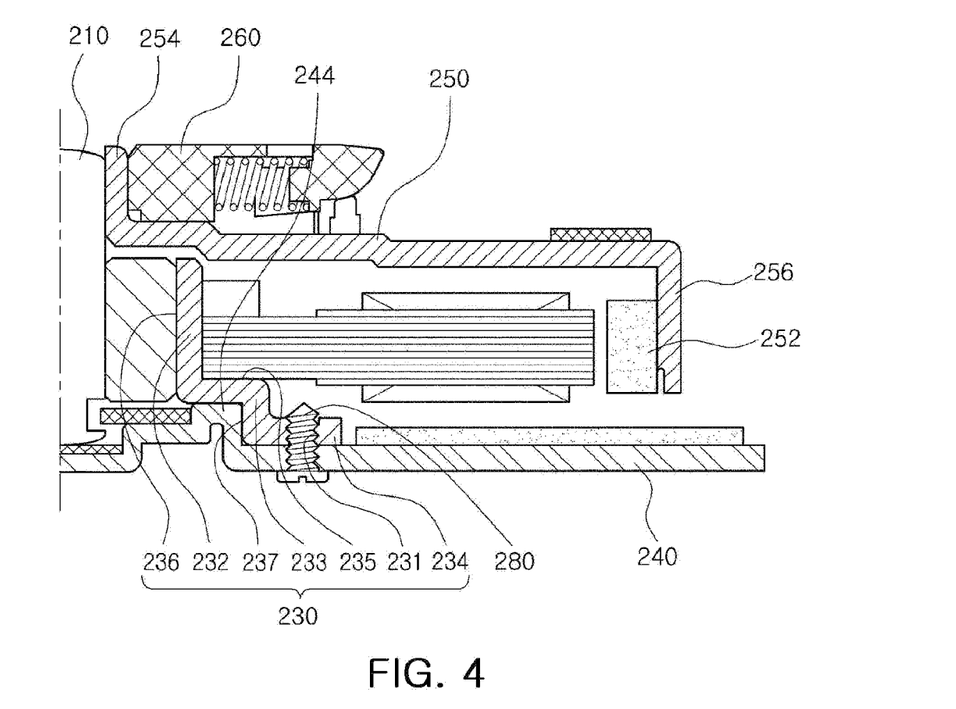
FIG. 4 is a cross-sectional view schematically showing a motor according to another exemplary embodiment of the present invention.
Figure 5:
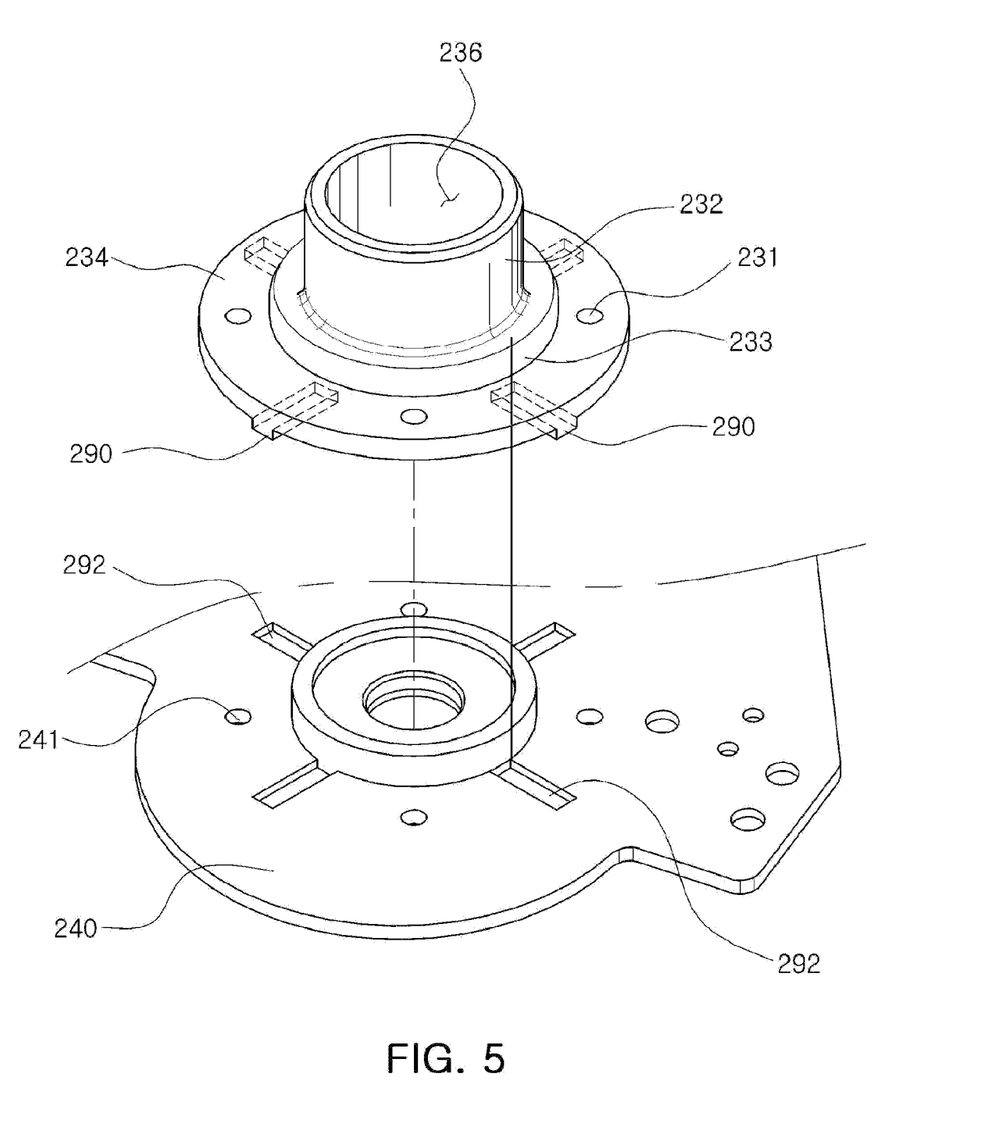
FIG. 5 is an exploded perspective view showing a sleeve holder and a base member according to another exemplary embodiment of the present invention.
Figure 6:
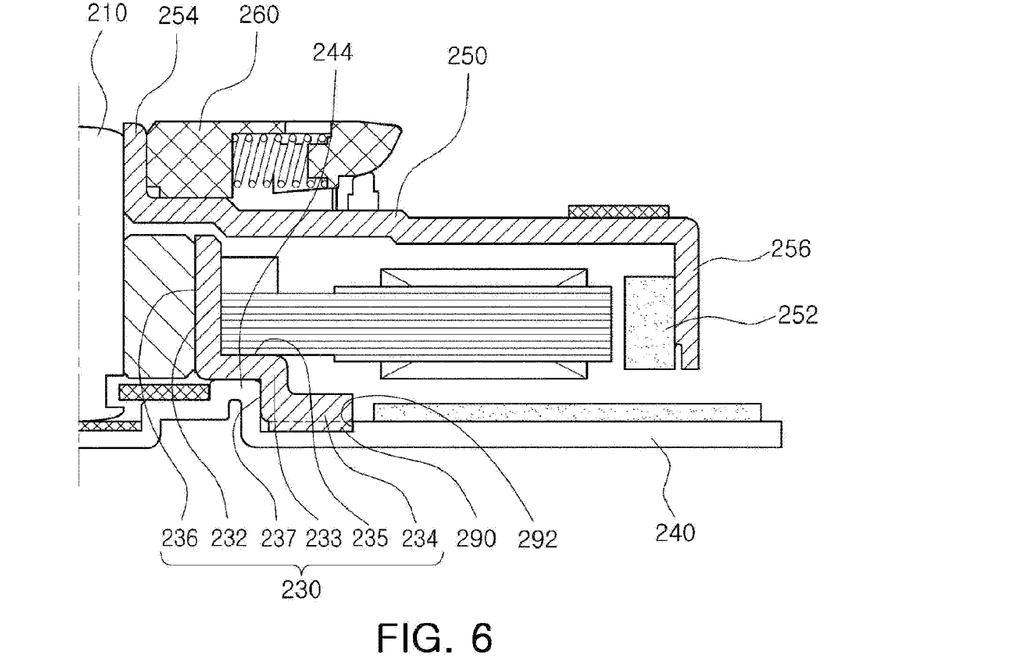
FIG. 6 is a cross-sectional view schematically showing a guide part and a guide counterpart of a motor according to another exemplary embodiment of the present invention.

FIG. 4 is a cross-sectional view schematically showing a motor according to another exemplary embodiment of the present invention, FIG. 5 is an exploded perspective view showing a sleeve holder and a base member according to another exemplary embodiment of the present invention, and FIG. 6 is a cross-sectional view schematically showing a guide part and a guide counterpart of a motor according to another exemplary embodiment of the present invention.

Referring to FIGS. 4 through 6, a motor 200 according to another exemplary embodiment of the present invention may include a sleeve 220, a sleeve holder 230, a base member 240, a rotor case 250, and a chucking unit 260.

Meanwhile, the sleeve 220, the rotor case 250, and the chucking unit 260 included in the motor 200 according to the present embodiment of the present invention correspond to the sleeve 120, the rotor case 150, and the chucking unit 160 included in the motor 100 according to the above-mentioned embodiment of the present invention and therefore, a detailed description thereof will be omitted.

In addition, a configuration related to fixing parts 231 and fixing counterparts 241 provided on the sleeve holder 230 and the base member 240 and a configuration related to guide parts 290 and guide counterparts 292 in this exemplary embodiment are different from those of the above-mentioned exemplary embodiment. Therefore, only configurations related to the fixing parts 231, the fixing counterparts 241, the guide parts 290 and the guide counterparts 292 will be described below, and descriptions of other configurations will be substituted with those described above.

First, the fixing parts 231 and the fixing counterparts 241 are provided in the sleeve holder 230 and the base member 240, respectively. Meanwhile, the fixing parts 231 and the fixing counterparts 241 may be configured as insertion holes and through holes as in the above-mentioned exemplary embodiment.

However, in this exemplary embodiment, female screw parts may be provided in the inner circumferential surfaces of the fixing parts 231 and the fixing counterparts 241 configured as the insertion holes and the through holes. That is, when the sleeve holder 230 is mounted on the base member 240, fixing supporters 280 configured as screws are coupled with the fixing parts 231 and the fixing counterparts 241 in the state in which the fixing parts 231 interlock with the fixing counterparts 241.

Therefore, the sleeve holder 230 may be fixedly mounted on the base member 240. Consequently, the sleeve holder 230 and the base member 240 are fixedly coupled by the fixing supporters 280 configured as the screws, such that the coupling force between the sleeve holder 230 and the base member 240 can be further improved.

However, the present invention is not limited to the case in which the fixing supporter 280 is configured as a screw, but the fixing supporter 280 may adopt any component, such as a rivet or the like, so long as it can be used to couple two members.

Meanwhile, in the exemplary embodiment, the guide parts 290 and the guide counterparts 292 may also cooperate with each other and be configured as grooves and protrusions for guiding a mounting position in which the sleeve holder 230 is mounted on the base member 240.

In this exemplary embodiment, the guide parts 290 may be configured as bar-like protrusions protruding from the bottom surface of a flange part 234 of the sleeve holder 230.

In addition, the guide counterparts 292 may be configured as grooves formed in the top surface of the base member 240 to be disposed between the fixing counterparts 241 while being disposed outwardly of the protruding part 244 in the radial direction. The guide counterparts 292 may be extended in the radial direction, such that they may be configured as elongated grooves having a predetermined length.

Therefore, when the sleeve holder 230 is mounted on the base member 240, the sleeve holder 230 may be temporarily fixed to the base member 240 by inserting the guide parts 290 of the flange part 234 into the guide counterparts 292.

Meanwhile, only a pair of guide part and guide counterpart may be provided in order to merely guide the mounting position.

Hereinafter, a motor according to another exemplary embodiment of the present invention will be described with reference to the drawings. However, a detailed description of the same components as those mentioned above will be omitted.

Figure 7:
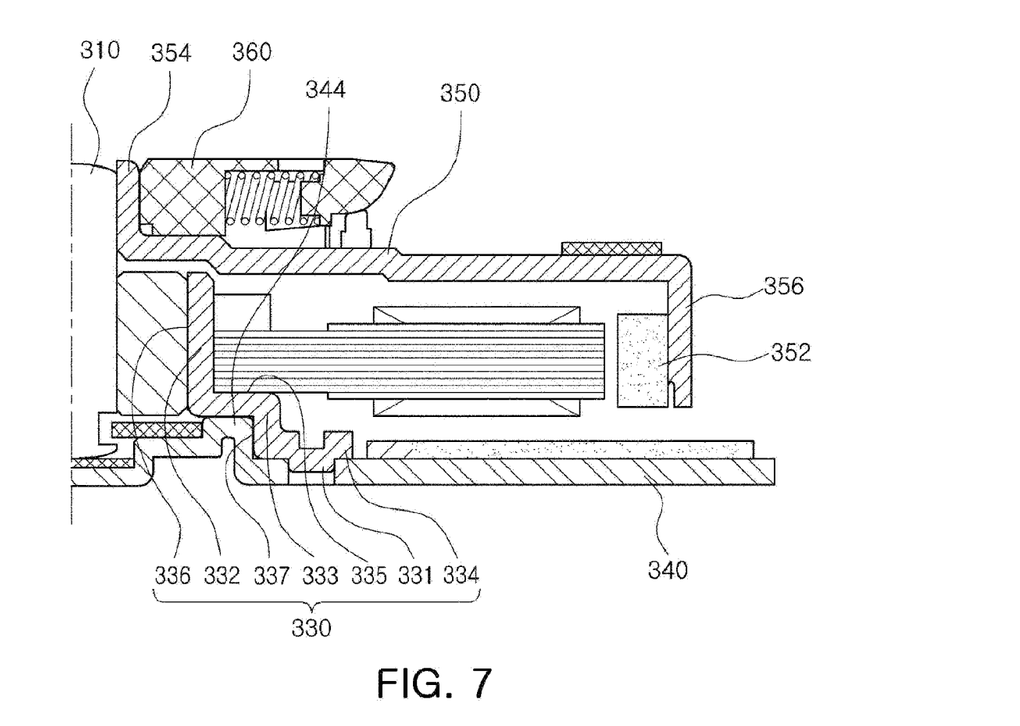
FIG. 7 is a cross-sectional view schematically showing a motor according to another exemplary embodiment of the present invention.

FIG. 7 is a cross-sectional view schematically showing a motor according to another exemplary embodiment of the present invention.

Referring to FIG. 7, a motor 300 according to the present exemplary embodiment of the present invention may include a sleeve 320, a sleeve holder 330, a base member 340, a rotor case 350, and a chucking unit 360.

Meanwhile, the sleeve 320, the rotor case 350, and the chucking unit 360 included in the motor 300 according to the present exemplary embodiment of the present invention correspond to the sleeve 120, the rotor case 150, and the chucking unit 160 included in the motor 100 according to the above-mentioned exemplary embodiment of the present invention and therefore, a detailed description thereof will be omitted.

In addition, the sleeve holder 330 and the base member 340 according to the present exemplary embodiment are the same as the sleeves 130 and 230 and the base members 140 and 240, other than fixing parts 331 and fixing counterparts 341 provided therein, and therefore, a detailed description thereof other than the fixing parts 331 and the fixing counterparts 341 will be omitted.

First, the fixing parts 331 may be configured as insertion protrusions protruding downwardly from the flange part 334 of the sleeve holder 330. The fixing counterparts 341 may be configured as through holes spaced apart from each other in the circumferential direction of the base member 340.

That is, when the sleeve holder 330 is mounted on the base member 340, the sleeve holder 330 may be fixed to the base member 340 by press-fitting the fixing parts 331 into the fixing counterparts 341.

As described above, the sleeve holder 330 may be fixedly mounted on the base member 340 more easily by the fixing parts 331 configured as the insertion protrusions and the fixing counterparts 341 configured as the through holes.

Hereinafter, a motor according to another exemplary embodiment of the present invention will be described with reference to the drawings. However, a detailed description of the same components as those described above will be omitted.

Figure 8:
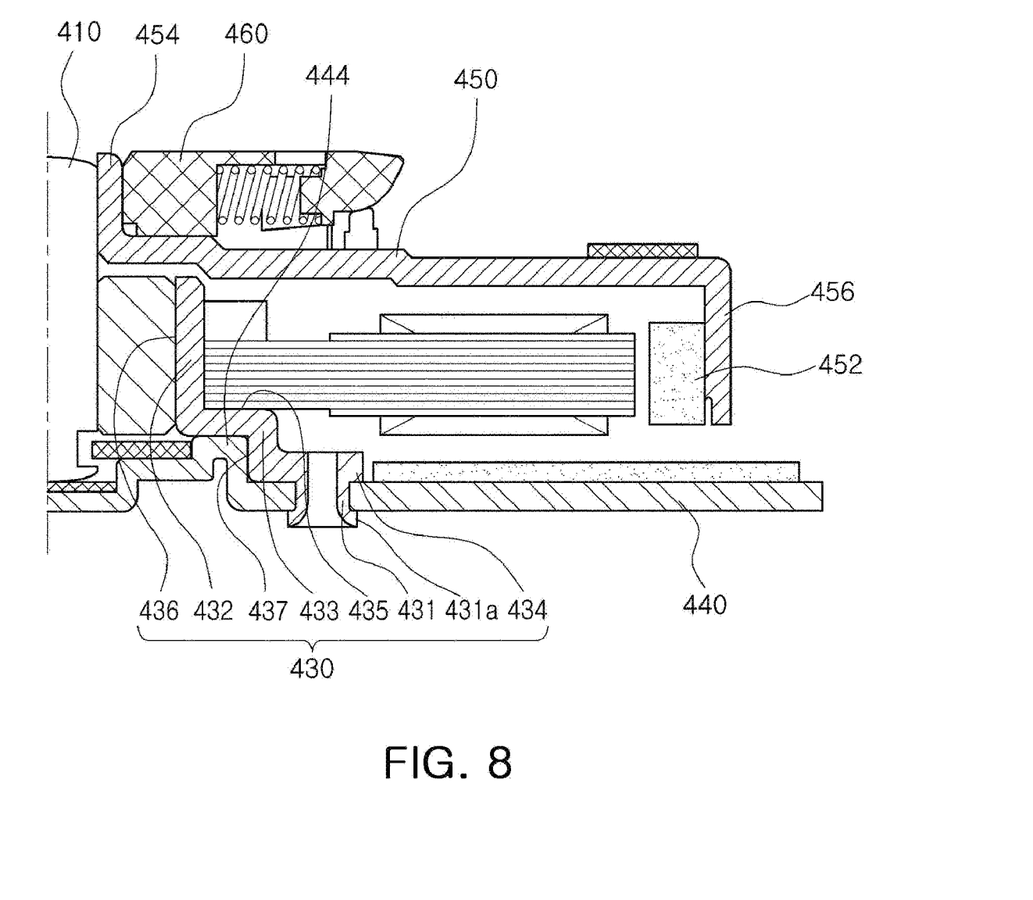
FIG. 8 is a cross-sectional view schematically showing a motor according to another exemplary embodiment of the present invention.

FIG. 8 is a cross-sectional view schematically showing a motor according to another exemplary embodiment of the present invention.

Referring to FIG. 8, a motor 400 according to another exemplary embodiment of the present invention may include a sleeve 420, a sleeve holder 430, a base member 440, a rotor case 450, and a chucking unit 460.

Meanwhile, the sleeve 420, the rotor case 450, and the chucking unit 460 included in the motor 400 according to the present exemplary embodiment of the present invention correspond to the sleeve 120, the rotor case 150, and the chucking unit 160 included in the motor 100 according to the exemplary embodiment of the present invention and therefore, a detailed description thereof will be omitted.

In addition, the sleeve holder 430 and the base member 440 according to the present exemplary embodiment are the same as the sleeves 130 and 230 and the base members 140 and 240, other than fixing parts 431 and fixing counterparts 441 provided therein, and therefore, a detailed description thereof other than the fixing parts 431 and the fixing counterparts 441 will be omitted.

The fixing parts 431 may be configured as insertion protrusions protruding downwardly from the flange part 434 of the sleeve holder 430. In addition, burning parts 431a may be provided in the fixing parts 431 for being fixedly coupled with the base member 440

Meanwhile, the fixing counterparts 441 may be configured as through holes spaced apart from each other in the circumferential direction of the base member 440.

That is, when the sleeve holder 430 is mounted on the base member 440, the fixing parts 431 may be press-fitted into the fixing counterparts 441 and then the burning parts 431a may be bent toward the base member 440, such that the sleeve holder 430 may be more firmly fixed to the base member 440.

As described above, the sleeve holder 430 is fixed to the base member 440 by the fixing parts 431 configured as the insertion protrusions and the fixing counterparts 441 configured as the through holes. In order to allow the sleeve holder 430 to be more firmly fixed to the base member 440, the burning parts 431a of the fixing parts 431 are bent to thereby securely fix the sleeve holder 430 to the base member 440.

Hereinafter, an optical disc driving device according to an exemplary embodiment of the present invention will be described with reference to the drawings.

Figure 9:
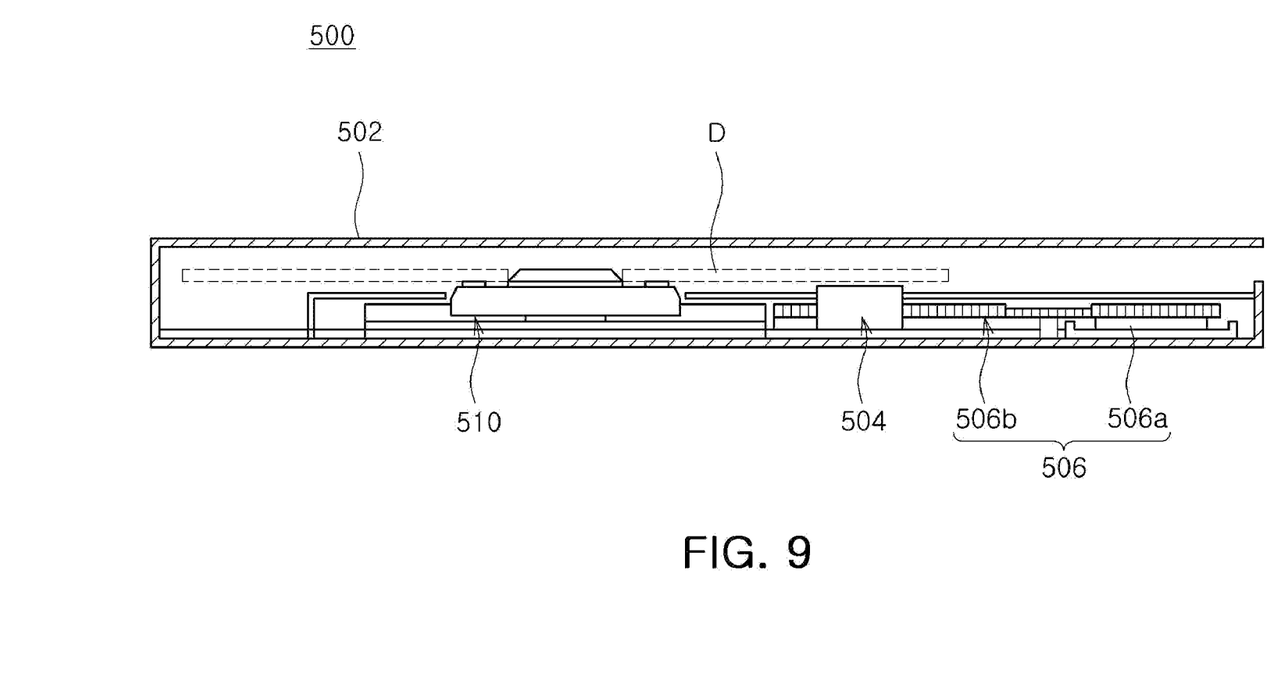
FIG. 9 is a cross-sectional view schematically showing an optical disc driving device according to an exemplary embodiment of the present invention.

FIG. 9 is a cross-sectional view schematically showing an optical disc driving device according to an exemplary embodiment of the present invention.

Referring to FIG. 9, an optical disc driving device 500 according to the exemplary embodiment of the present invention includes a motor 510 mounted therein. The motor 510 may be one of the above-mentioned motors 100, 200, 300, and 400.

Further, the optical disc driving device 500 according to the exemplary embodiment of the present invention includes a housing 502, an optical pickup unit 504, and a driver 506.

The housing 502 may include an opening, through which a disc D is placed in or taken out, and have an inner space, in which the motor 510, the optical pickup unit 504, and the driver 506 may be installed.

Meanwhile, the base member 140 (see FIG. 1) including a printed circuit board (not shown) on which the motor 510 is mounted may be fixed in the housing 502.

The optical pickup unit 504 irradiates light to the disc D rotated by the motor 510 and receives reflected light therefrom. That is, the optical pickup unit 504 may be mounted in the housing 502 such that it is disposed under the disc D in order to implement a lightscribe function able to print characters, drawings, or the like, on the disc D.

In addition, the driver 506, connected to the optical pickup unit 504, moves the optical pickup unit 504 in the circumferential direction of the disc D.

The driver 506 transfers driving force, generated from a driving motor 506a, to the optical pickup unit 504 through a power transfer unit 506b and thus, the optical pickup unit 504, while moving in the circumferential direction of the disc D, irradiates light to the disc D and receives reflected light therefrom.

Meanwhile, the motor 510 has been described in detail in the above-mentioned exemplary embodiments, so a detailed description thereof will be omitted.

As set forth above, according to exemplary embodiments of the present invention, a sleeve holder and a base member may be accurately positioned by a guide part and a guide counterpart, thereby facilitating the manufacturing process.

Further, the sleeve holder may be fixed to the base member in the state in which the sleeve holder is temporarily fixed to the base member by the guide part and the guide counterpart, thereby improving the verticality of the sleeve holder.

Further, the sleeve holder is mounted on the base member in order that a protruding part provided on the base member contacts an inner circumferential surface of an extension part of the sleeve holder, thereby further improving the verticality of the sleeve holder.

In addition, the sleeve holder may be fixedly coupled to the base member by coupling a fixing supporter with a fixing part and a fixing counterpart, whereby the assembly process of the sleeve holder and the base member can be facilitated.

Further, the sleeve holder may be fixedly coupled to the base member by the fixing part and the fixing counterpart to thereby improve the coupling force between the sleeve holder and the base member and reduce the incidence of separation of the sleeve holder from the base member.

In addition, since the sleeve holder may be coupled to the base member by the fixing part and the fixing counterpart, in the case in which defects occur therein, the sleeve holder may be easily separated from the base member.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
   a sleeve rotatably supporting a shaft;
   a sleeve holder having the sleeve inserted thereinto and including fixing parts; and
   a base member including fixing counterparts corresponding to the fixing parts of the sleeve holder and fixedly coupled to the sleeve holder,
   wherein the sleeve holder and the base member have guide parts and guide counterparts respectively provided therein, the guide parts and the guide counterparts having corresponding shapes and guiding the sleeve holder to a mounting position thereof,
   wherein the guide parts and the guide counterparts cooperate with each other and are configured as grooves and protrusions for guiding the mounting position in which the sleeve holder is mounted on the base member, and
   wherein the guide parts and the guide counterparts are respectively disposed to be spaced apart from each other in a circumferential direction in order to prevent the sleeve holder from rotating.

2. The motor of claim 1, wherein the fixing counterparts are configured as through holes disposed in the base member to be spaced apart from each other in a circumferential direction,
   the fixing parts are configured as insertion holes interlocking with, the fixing counterparts, and
   the fixing parts and the fixing counterparts are coupled with fixing supporters to thereby fix the sleeve holder to the base member.

3. The motor of claim 1, wherein the fixing counterparts are configured as through holes disposed in the base member to be spaced apart from each other in a circumferential direction, and
   the fixing parts are configured as insertion protrusions inserted into the fixing counterparts.

4. The motor of claim 3, wherein the fixing parts have burning parts for being fixedly coupled with the base member.

5. The motor of claim 1, wherein the sleeve holder includes:
   a body part in which the sleeve is fixedly mounted;
   an extension part stepped from the body part in order to have a larger outer diameter than that of the body part; and
   a flange part extended outwardly from the extension part in a radial direction.

6. The motor of claim 5, wherein the body part is connected with the extension part stepped from the body part to thereby form a stator seating surface on which a stator is horizontally mounted.

7. The motor of claim 5, wherein the base member includes;
   a shaft groove having the shaft disposed on an upper portion thereof;
   a stopper ring support part having a step from the shaft groove; and
   a protruding part extended upwardly from the stopper ring support part.

8. The motor, of claim 7, wherein the protruding part is disposed in an extended hole extended from a mounting hole provided in the body part to fix the sleeve when the sleeve holder is mounted on the base member.

9. The motor of claim 1, wherein the guiding parts are mounted on the base member to be disposed between the plurality of fixing counterparts formed on the base member, and the guide counterparts are formed on a flange part provided in the sleeve holder to be disposed to correspond to the guide parts.

10. The motor of claim 1, further comprising a rotor case coupled to an upper portion of the shaft and including a magnet disposed to be opposite to a stator seated on the sleeve holder.

11. The motor of claim 10, further comprising a chucking unit mounted on an outer circumferential surface of a hub extended upwardly from the rotor case and allowing a disc to be mounted thereon.

12. The motor of claim 1, wherein the sleeve holder is molded by a press process.

\* \* \* \* \*